United States Patent [19]

Randa

[11] Patent Number: 4,716,073

[45] Date of Patent: Dec. 29, 1987

[54] THIN WALL HIGH PERFORMANCE INSULATION ON WIRE

[75] Inventor: Stuart K. Randa, Wilmington, Del.

[73] Assignee: E. I. Du Pont de Nemours and Company, Wilmington, Del.

[21] Appl. No.: 869,778

[22] Filed: Jun. 2, 1986

[51] Int. Cl.[4] .......... B32B 7/02

[52] U.S. Cl. .......... 428/215; 428/318.8; 428/319.1; 428/376; 428/380; 428/422; 521/145

[58] Field of Search .......... 428/215, 318.8, 319.1, 428/422, 380, 376; 526/145

[56] References Cited

U.S. PATENT DOCUMENTS

| | | | |
|---|---|---|---|
| 3,072,583 | 1/1963 | Randa | 260/2.5 |
| 4,309,160 | 1/1982 | Poutanen et al. | 425/113 |
| 4,331,619 | 5/1982 | Baumgaertner | 264/13 |
| 4,394,460 | 7/1983 | Baumgaertner | 521/92 |

OTHER PUBLICATIONS

Maillefer Technical Report #17.

Hitachi Cable KK, Japanese Patent No. J57 119412-A, Jan. 19, 1981, (Derwent Abstract).

*Primary Examiner*—Morton Foelak

[57] ABSTRACT

This invention relates to the use of ethylene/tetrafluoroethylene (ETFE) or ethylene/chlorotrifluoroethylene (ECTFE) polymers to produce a foamed coating of insulation over wire and used as wire pairs for transmitting electronic signals, in which the foamed coating is surrounded by a protective jacket or skin made of one of the two polymers.

3 Claims, No Drawings

THIN WALL HIGH PERFORMANCE INSULATION ON WIRE

FIELD OF THE INVENTION

This invention relates to the use of ethylene/tetrafluoroethylene (ETFE) or ethylene/chlorotrifluoroethylene (ECTFE) polymers to produce a foamed coating of insulation over wire for transmitting electronic signals, in which the foamed coating is surrounded by a protective jacket or skin made of one of the two polymers.

BACKGROUND OF THE INVENTION

Electrical wire is used to transmit electronic signals. The wire must be protected, or insulated, and plastic coatings are ordinarily extruded from a molten state onto and around the wire. These plastic materials are chosen to have a low dielectric constant and a low dissipation factor. It has previously been found that if the plastic is foamed as it is applied to the wire, the dielectric constant is desirably lowered, due to the formation of numerous small cells in the foam.

Foamed insulation around transmission wire is described in U.S. Pat. No. 3,072,583 to S. K. Randa where he describes a nucleated foaming process for extruding perfluorinated polymer, e.g., ethylene/propylene (FEP) copolymer, foam with a dissolved gas blowing agent. Because of its high viscosity, FEP foam is difficult to extrude onto wire at high rates.

U.S. Pat. Nos. 4,331,619 and 4,394,460 to Chung et al. relate to a nucleated, chemically blown foam composition based on fluorinated copolymers, preferably ethylene-chlorotrifluoroethylene copolymers. This patent describes the foam on wire only in terms of average cell size. It does not address the problem of low dielectric strength due to structural failure of the foam. Foam insulation can be weakened structurally and electrically when several foam cells are aligned radially between the wire and the outer surface of the foam insulation, and/or when two or more foam cells substantially larger than average are so aligned, or when the size of a single cell approaches the thickness of the insulation. Electrical test data are not reported in these patents, but the Examples imply that pin holes are present in the coating, by stating that "a minimum of pinholes appear at the surface".

Sometimes a skin or jacket is placed around the foam wire construction to protect the assembly. For example, U.S. Pat. No. 4,309,160 to Poutanen et al. discloses an apparatus and a method for forming a foam and an unfoamed skin around telephone wire. The patent points out that the foam provides good electrical properties (i.e., low dielectric constant) and the unfoamed outer layer, or skin, provides good mechanical properties. In this patent, the foam and skin are made of the same plastic material, but fluorinated polymers are not mentioned.

Similarly, Maillefer Technical Report 17 teaches extrusion techniques for foam-skin extrusion onto wire. It deals mainly with polyethylene foam/polyethylene skin constructions, and does not suggest the use of fluorine-containing polymers.

There is a need for high speed extrusion of both foam and skin onto electrical wire.

SUMMARY OF THE INVENTION

This invention comprises foamed coatings of high electrical quality around a center wire, covered by an outer unfoamed polymer skin for protection. The foam and the skin are made of a copolymer of ethylene/tetrafluoroethylene (ETFE) or a copolymer of ethylene/-chlorotrifluoroethylene (ECTFE). The foam and skin can be made of the same copolymer, but need not be. The copolymers used should contain 40–60 mole % ethylene (E), 60–40 mole % tetrafluoroethylene (TFE) or chlorotrifluoroethylene (CTFE), and may also contain up to 10 mole % of a copolymerizable monomer which is substantially free of telogenic activity. This termonomer may preferably be a vinyl monomer which provides a side chain having at least two carbon atoms as described in U.S. Pat. No. 3,342,777; or a perfluoroalkyl ethylene having the formula $CH_2{=}CHR_f$ as described in U.S. Pat. No. 4,123,602. The ETFE copolymer should have melt viscosities in the range of 0.5 to $0.9\times10^4$ poise at 298° C. as measured by ASTM D-1238. If the skin has a lower melt viscosity than the foam polymer, it facilitates extrusion of the skin around the foam.

The foam provides a low dielectric constant. The outer skin is not foamed and has a higher dielectric constant, but the skin does not significantly shift the mutual capacitance properties as measured between pairs in the cable assembly.

The selection of ETFE or ECTFE materials for telecommunications wire and cable (telephone and optical fiber) is an advantageous construction. A foam previously available was Teflon ® FEP fluorocarbon foam resin (TFE/HFP), i.e., fluorinated ethylene/propylene, of U.S. Pat. No. 3,072,583, which gave better heat resistance and flame resistance than the theretofore known polyethylene, and the unspecified "plastic" of U.S. Pat. No. 4,309,610.

However, compared with FEP foam, the present ECTFE or ETFE constructions give surprising improvements in crush resistance, dielectric strength, colorability, and ease of fabrication. It might be expected that the use of ETFE and/or ECTFE would result in deficient dielectric constant and dissipation factor because the polymers are inferior to FEP in electrical properties. However, the constructions of this invention do have good electrical properties.

It might further be expected that flame retardants might have to be added to these materials, which are less resistant to burning than the perfluorinated FEP, with consequent further deficiencies in electrical properties and extrusion rate, but it has now been found that adequate flame resistance of a cable bundle is achievable without the use of flame retardants. These coated wires give passing performance in UL 910, the standard commercial Steiner tunnel test for flame propagation and smoke.

DESCRIPTION OF THE INVENTION

The invention allows fluoropolymers to be made into unusually thin-walled foam insulation around wire protected by a thin hard skin or jacket around the foam. Thinner walls are desirable because space is saved. For example, a 24 AWG solid wire with a 0.125 mm (5 mil) wall of foam insulation around it has an outside diameter of only 0.76 mm (30 mil), whereas if the wall is 0.5 mm (20 mil) thick, the diameter is 1 5 mm (60 mil), about twice as great.

Twisted wire pairs, i.e., two wires twisted around each other, are traditionally used to transmit electrical signals. Twisted wires are advantageous because of their simplicity. The lower the insulation's dielectric constant, the better the speed and quality of the signal. The fluorinated resins used in this invention have a very low dielectric constant, and foaming these fluoropolymers further decreases dielectric constant to make the insulation even more desirable. Unfortunately, the twisting of a foam-insulated wire tends to crush the foam, causing increased mutual capacitance and sometimes decreased dielectric strength.

To improve mechanical strength, a thin skin (5% to 35% of the entire insulation thickness) of an unfoamed ETFE or ECTFE is used in this invention as an overcoating. This skin can be applied in a secondary extrusion or in a dual simultaneous extrusion.

The outer coating, with its higher dielectric constant, was found to have little influence on the overall dielectric constant and, in turn, little influence on the transmitted speed and quality of the signal. Therefore, the unfoamed tough skin can be positioned as the exterior of the foam without detracting from the cable performance. With the protective skin present, the inner coating can be foamed to even a higher degree of voids. Furthermore, if the skin polymer has high melt fluidity, this will aid in the extrudability of the total composition in a simultaneous extrusion. The skin provides greater resistance to crushing forces such as are encountered in making twisted pairs.

Without these tougher outer coatings, it is difficult to make miniature (i.e., thin insulations) twisted pair wire structures having the low mutual capacitances (5 to 15 pf/ft) needed for cable systems and still having adequate dielectric strength between pairs.

The fluoropolymers used provide low dielectric constant in foamed form, a high dielectric strength in unfoamed form, and low mutual capacitance between twisted pairs of insulated wires. They also provide high temperature resistance, low flame spread and smoke emission without the addition of flame and smoke suppressants, mechanical strength for the twinning operation used to make twisted pairs of wires, strength, toughness, and good colorability of the insulation on each wire to aid in installation and service.

In one embodiment, the thin skin of solid fluorinated polymer can be simultaneously extruded with the foam, using two extruders and one crosshead.

Typically, the foam-skin composites described are 25–70% void content foam with a wall thickness of 2–30 mils (0.05–0.76 mm) covered by a solid skin of 0.5–5 mils (0.013–0.127 mm) thickness, and an average cell size of 0.05–0.12 mm (2–5 mils) (closer to 0.05 mm in thin insulations and closer to 0.12 mm in thicker insulations).

An equipment set-up for the simultaneous extrusion of foam and skin on wire consists of a 2" (5 cm) diameter Davis Standard extruder with a 24/1 length to diameter (L/D) ratio equipped with a DC drive motor capable of at least 50 rpm screw speed, screws designed for foaming using either liquid or gas "Freon" 22 fluorocarbon injection, an auxiliary " (2.54 cm) diameter screw extruder with a 20/1 L/D used to provide the melt which forms the outer skin, an electronic wire preheater, a commercial dual coating foam-skin crosshead with an extrusion die, a water bath, a capstan with an AC motor drive capable of wire speeds of 50 fpm to as high as 5,500 fpm, (15–1675 meter/min), and in-line electronic equipment for the continuous monitoring of the insulated wire diameter and capacitance. The melt pressure of the molten resin is observed and the wire speed adjusted or extrusion speed adjusted accordingly.

Any liquid or gaseous foaming agent can be used to promote foam formation. The polymer to be foamed may contain a nucleating agent such as boron nitride. The foam and the skin can be extruded onto wire in any conventional fashion.

The Examples illustrate the nature of the invention. In the Examples, the equipment used was as described above. A pressure extrusion die having a 0.028 inch (0.71 mm) or 0.023 inch (0.9 mm) die orifices was used. Dies having internal angles from 15° to 60° can be used. Barrel, adaptor and crosshead temperatures of 600°–635° F. (316°–335° C.) were employed. The die temperature was 700° F. (371° C.), the melt pressure was 600 psi (4.1 MPa), "Freon" 22 fluoropolymer gas pressure of 90 psig (0.6 MPa) was used, the screw speed was 20 rpm and the wire speed was 650 fpm (198 m/min). Resin shear rate at the die surface was calculated as $7\times10^4$ seconds$^{-1}$.

COMPARATIVE EXAMPLE A

In this Example, a foam of ethylene/tetrafluoroethylene (ETFE) copolymer was extruded to form insulation around a wire. No skin was present.

ETFE, 50/50 mole % with a small amount of perfluorobutyl ethylene termonomer (which is about 20.4 wt. % ethylene, 77.5 wt. % tetrafluoroethylene and 2.1 wt. % $C_4F_9CH{=}CH_2$) of melt viscosity $0.9\times10^4$ poise was used to extrude a 6 mil (0.15 mm) foam with about 40% void content on AWG 24 solid copper wire (20.1 mil [0.5 mm]in diameter). The foam cells were closed and averaged 2 mils (50 micrometers) in diameter as determined by measuring enlarged cross-sectional photographs of the samples. This 31 mil (0.8 mm) total wire construction possessed a coaxial cable capacitance of 72± pF/ft. This corresponds to a dielectric constant of 1.85 (unfoamed ETFE has a dielectric content of 2.6).

The wire construction has the following additional properties: Tensile strength is 2000 psi (13.8 MPa) for the foamed coating. Tensile elongation is 100% for the foamed coating. Crush resistance for the wire construction is 712 pounds (323 kg). The wire is crushed between 2 parallel plates 2 inches long and failure is considered to be the force needed to cause electrical shorting of the plates to the conductor. Dielectric strength is 500 volts/mil. (volts/25.4 micrometer).

When foamed wire constructions similar to this one were formed into pairs, the DC dielectric strength was found to be less than 2000 VDC.

EXAMPLE 1

A foam-skin composite was extruded onto wire using the same ETFE as in Comparative Example A. This produced a 5 mil (0.127 mm) foam with 45% voids and a 1 mil (0.025 mm) pigmented solid unfoamed skin on AWG #24 copper wire. The extrusion conditions were reproduced as closely as possible to those used for the 6 mil (0.15 mm) foam insulation formed in Comparative Example A except the auxiliary 1" (2.54 cm) extruder was used to provide pigmented polymer melt of ETFE to the dual coating crosshead for the skin. The foam cells were closed and averaged 2 mils (50 micrometers) in diameter.

The 6 mil (0.15 mm) insulation of foam-skin was tested by forming twisted pairs. The pairs easily passed 2500 V, averaging 6000 V in DC dielectric strength between pairs. This was surprising. Another important electrical measurement for twisted pairs of wires is mutual capacitance between pairs. The calculated mutual capacitance values for the 6 mil foam with 45% void content of Comparative Example A and the 5 mil (0.127 mm) foam with 45% void content covered with a 1 mil (0.025 mm) solid skin of Example 1 are 14.2 and 14.7 picofarads/ft (46.6 and 48.2 picofarads/m), respectively, which is better than standard telephone wire.

The results of these two types of electrical tests indicate that the use of a fluorinated polymer in a foam-skin insulation provides a substantial increase in dielectric strength with an almost insignificant increase in the value for mutual capacitance of twisted pairs.

EXAMPLE 2

In this Example the foam was ECTFE and the skin was ETFE. The technique was different because the ECTFE, Allied "Halar" 558, contained a chemical blowing agent, so no gaseous blowing agent was added.

The extruder used for ECTFE had a 0.040 inch (1 mm) die orifice and an included angle of 60°. The barrel temperature was 249° C., the crosshead temperature was 282° C., and the die temperature was 304° C. Screw speed for ECTFE was 13 rpm.

The ETFE was similar to that in the Comparative Example except it had a melt viscosity of $0.75\times10^4$ poise at 298° C. Melt pressure at the die was 1500–1900 psi (10- 12.7 MPa), and wire speed was 150 feet/min (4.6 m/min).

IR analysis confirmed the wire sample to have a skin coating of ETFE resin. The foam beneath was "Halar" ECTFE resin "blown" by Allied's resin-incorporated chemical blowing agent. Calculation showed the insulation void content to be 20% (electrical data) to 27% (weight and geometry data). The dielectric strength of the primary E159-58-4 wire samples in 10 ft lengths tested in salt solution was 1500 volts, a.c. The average voltage between conductors of twisted pairs in a final 4-pair cable, ~10 ft long averaged 5500 volts, d.c.

I claim:

1. An electrical wire covered with an extruded fluoropolymer foam layer comprising ethylene/chlorotrifluoroethylene copolymer or ethylene/tetrafluoroethylene copolymer and an extruded fluoropolymer unfoamed skin layer around the foam comprising ethylene/chlorotrifluoroethylene copolymer or ethylene/tetrafluoroethylene copolymer; wherein the foam layer is between 0.05–0.76 mm thick and the skin layer is between 0.013–0.076 mm thick and wherein the foam layer and the skin layer are each formed by separate extrusions, which extrusions can be either simultaneous or in sequence.

2. The wire of claim 1 wherein the wire is solid or stranded copper wire of 40 to 20 overall AWG gauge size.

3. Pairs of the wires defined in claims 1 or 2.

* * * * *